3,295,722
LIQUID DISPENSING APPARATUS

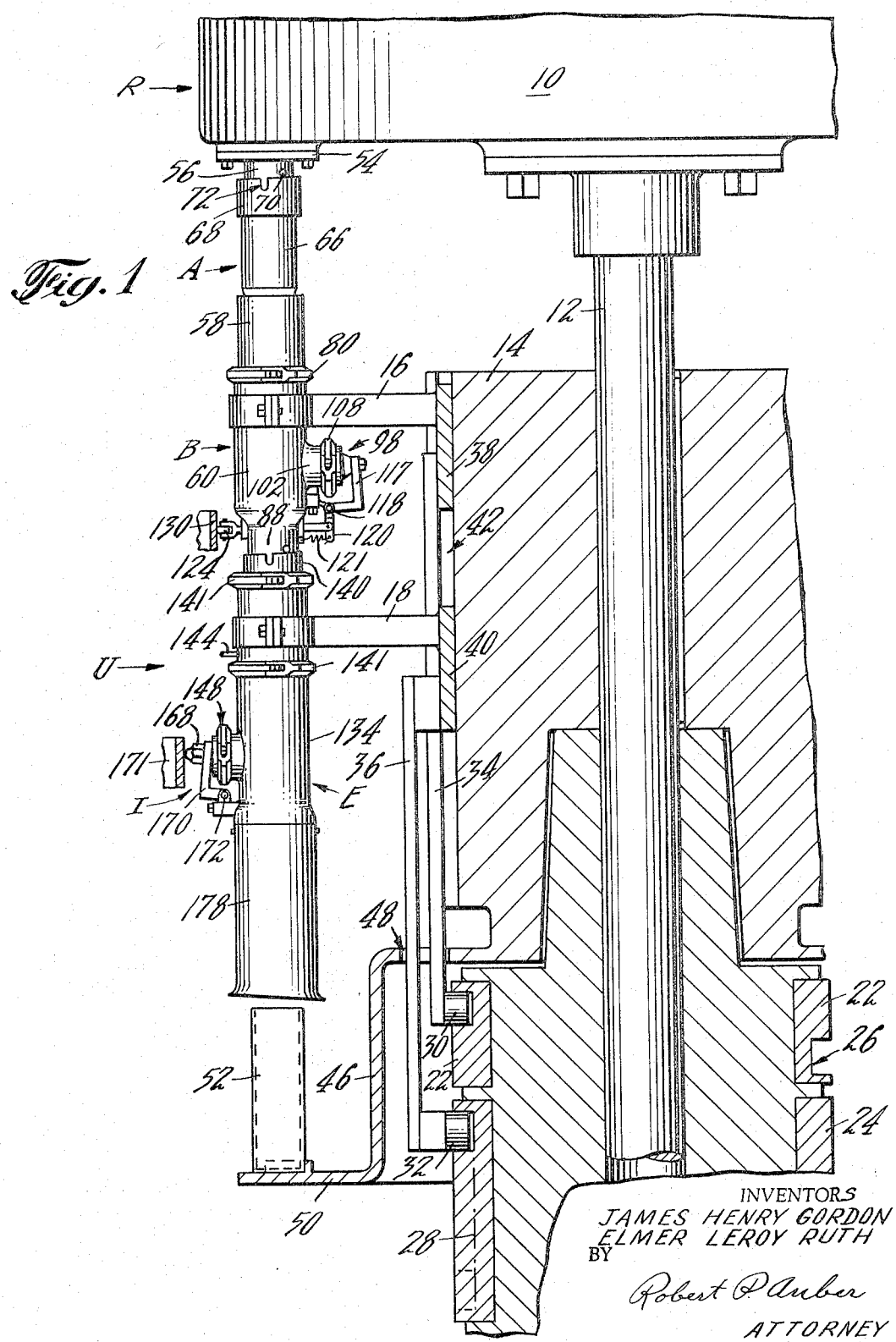

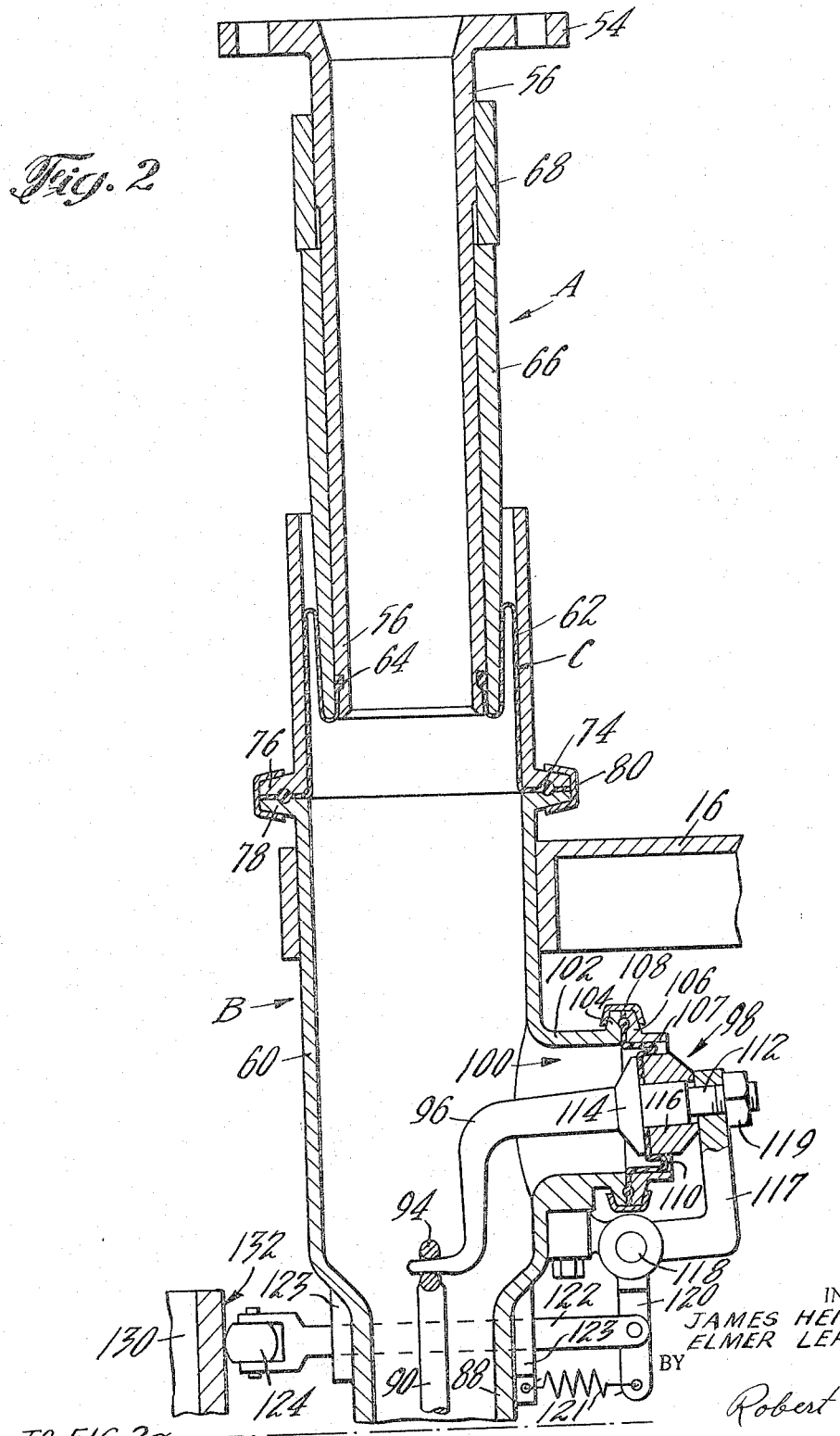

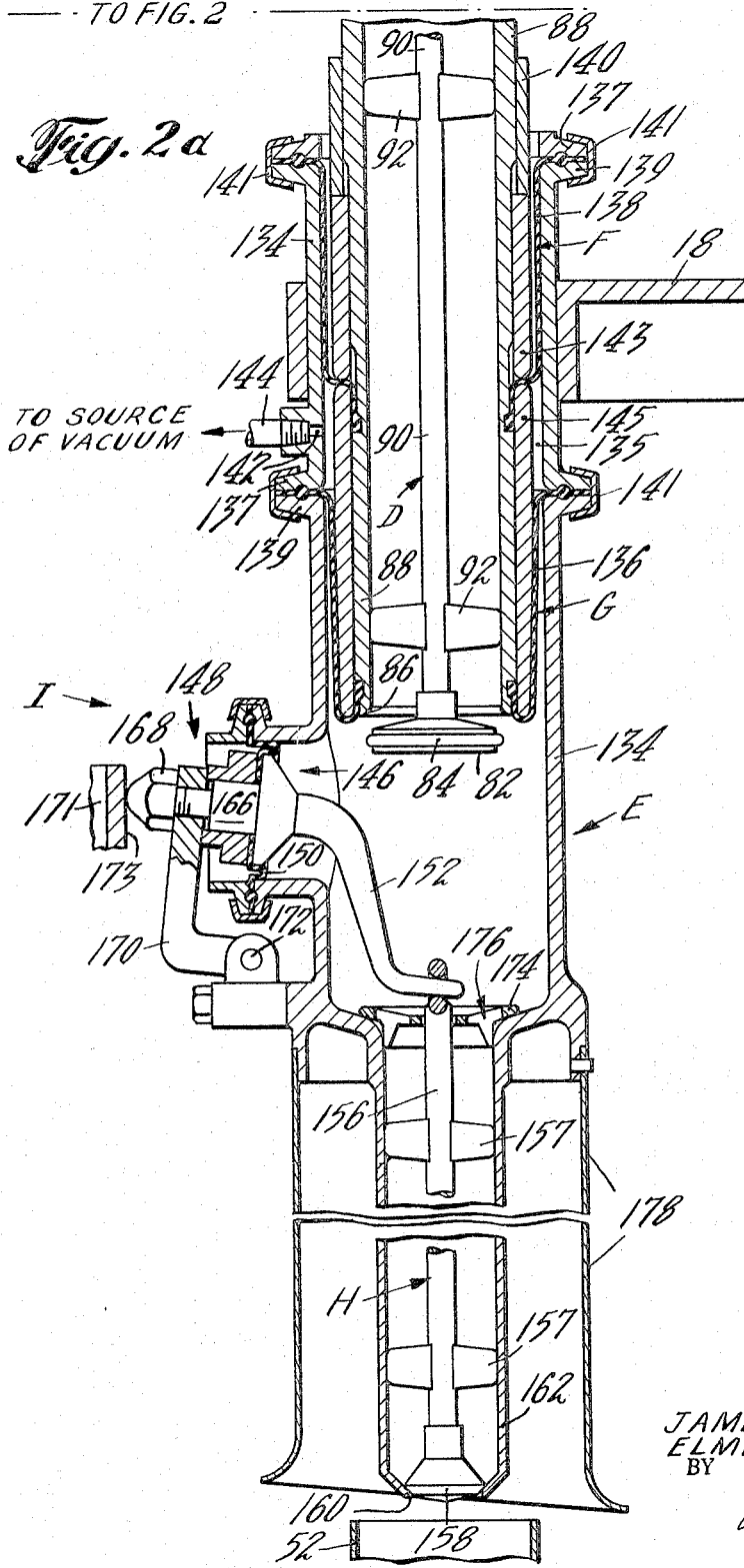

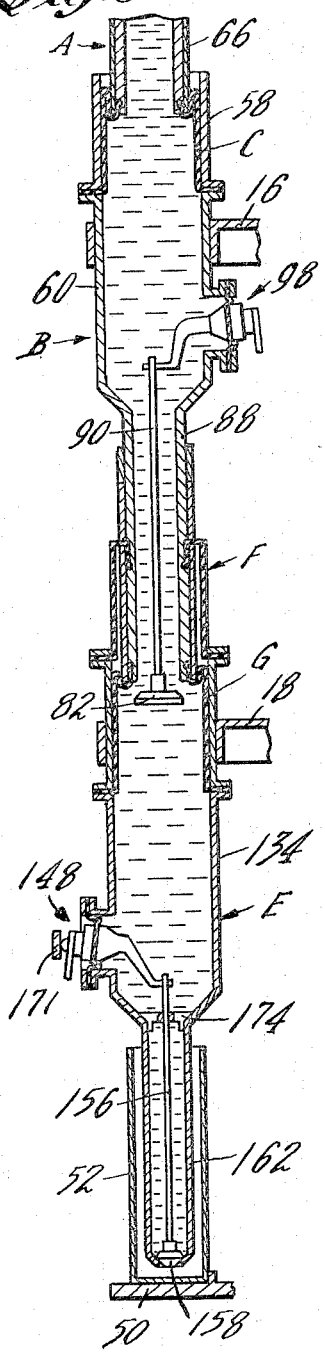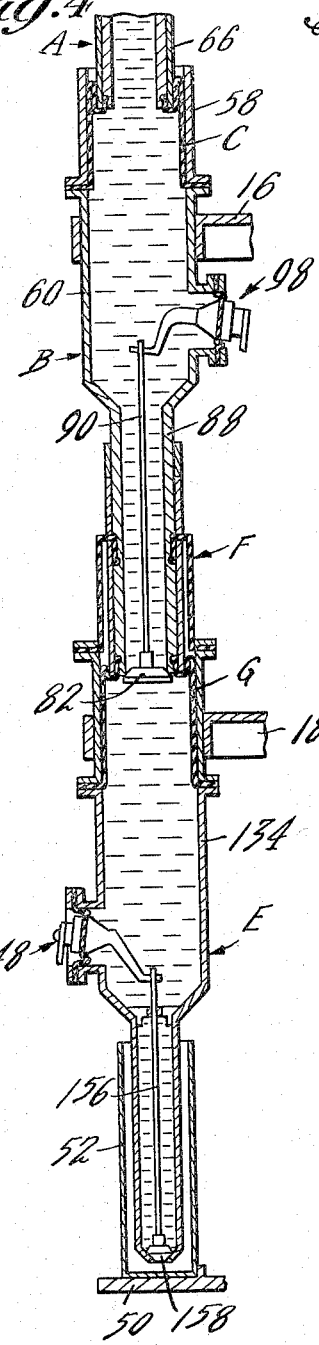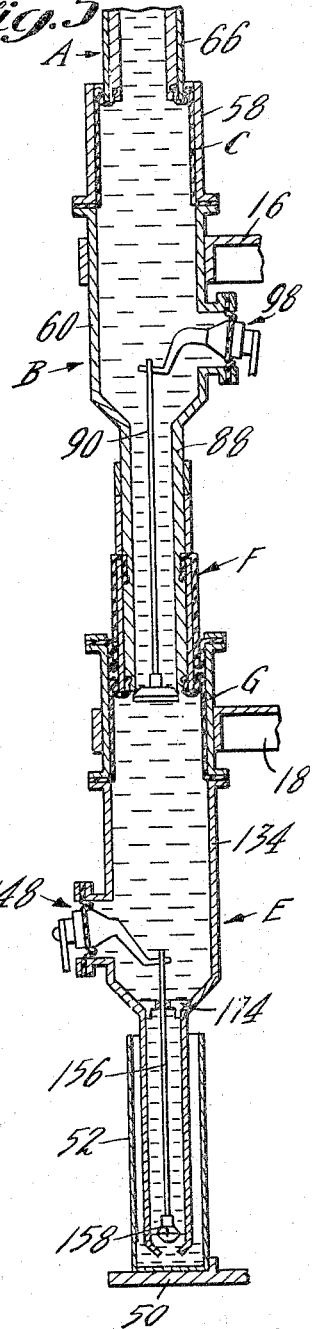

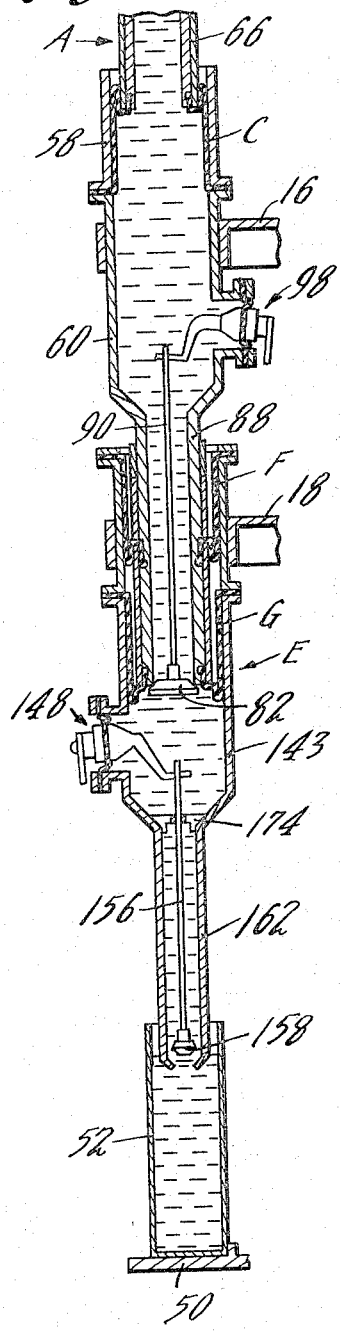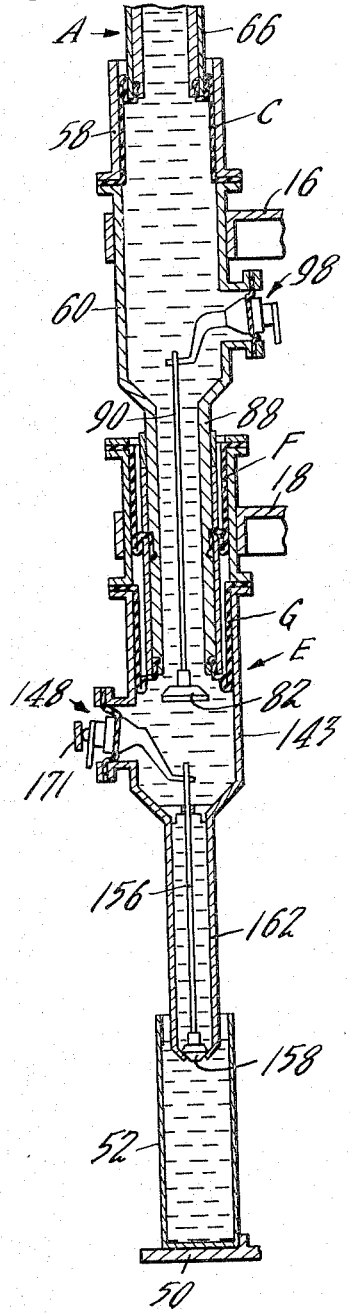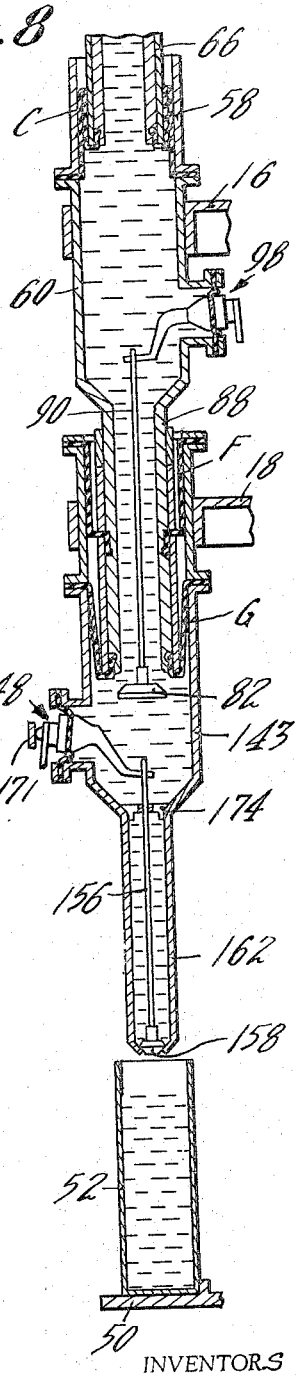

James Henry Gordon, Morris Plains, N.J., and Elmer Leroy Ruth, Green Bay, Wis., assignors to American Can Company, New York, N.Y., a corporation of New Jersey
Filed Feb. 2, 1965, Ser. No. 429,741
6 Claims. (Cl. 222—52)

The instant invention relates to an apparatus for the dispensing of a metered quantity of a liquid and, in particular, to a device for transferring a liquid from a reservoir therefor and by means of sequentially timed movements, filling a metered quantity of the liquid into a suitable receptacle therefor.

The apparatus of the instant invention, although suitable for the metering and dispensing of a wide variety of liquids, is primarily designed for the automatic filling of milk into a shipping and retailing container therefor, and will be described hereinafter in relation to this function. Although automatic milk filling machines, in general, are no means new in the art, the instant device performs this function in an improved, highly efficient and accurate manner.

It is therefore an object of the instant invention to provide a novel apparatus for automatically filling a liquid into a suitable receptacle therefor.

Another object is to provide a novel apparatus for the automatic filling of a liquid into a shipping and retailing container therefor in a highly efficient and accurate manner.

Yet another object is to provide a novel automatic liquid filling device which is readily sanitized and maintained in this condition.

Still another object is to provide a novel apparatus of the character described which will automatically cease dispensing liquid during stoppage of the apparatus.

An additional object is to provide a novel apparatus for the filling of liquid into a suitable container under positive pressure controlling the filling rate with little or no foaming or frothing of the liquid during filling.

Numerous other objects and advantages of the invention will be apparent as it is better understood from the following description which, taken in connection with the accompanying drawings, discloses a preferred embodiment thereof.

The above objects are accomplished by providing, in a milk-filling machine, at least one metering-filling unit comprising telescoping members each connected by liquid-tight resilient seals and valve means between certain of the telescoping members, opening and closing in timed sequence with each other and with the telescoping movement of the members so as to transfer a metered quantity of milk from a reservoir on the machine, through the unit and into a suitable container properly disposed in relation to the unit. The properly timed telescoping of the members of the unit in association with the opening and closing of the valve means, in effect, causes the unit to act in the manner of a piston-pump to provide accurate and positive filling of the metered quantity of milk into the container but under controlled pressure conditions so as to minimize, if not obviate frothing of the milk during filling.

Referring to the drawings:

FIG. 1 is a fragmentary, elevational view partly in section showing the disposition of one of the metering-filling units in a rotary, milk-filling machine;

FIGS. 2–2A, when joined along the line indicated, is a sectional, elevational view of the details of the metering-filling unit; and FIGS. 3 through 8 are schematic views showing the sequence of movement of the respective members of the metering-filling unit during its operation.

In general, the metering-filling unit U (FIGS. 2–2A) of the instant invention comprises an upper, hollow connecting tube A fixed to a reservoir R of a rotary, milk-filling machine. Surrounding the lower end of the tube A in telescoping relation is a substantially tubular upper body B joined to the tube A in a fluid-tight connection by means of a resilient seal C. A stem valve D, maintained normally closed, is automatically opened to communciate the interior of the upper body B with the interior of a lower body or dispensing tube E, the upper end of which surrounds the body B in telescoping relation and is connected thereto in a fluid-tight joint by a pair of resilient seals F and G. After opening of the valve D, the tube E automatically descends from its telescoped relation to body B thereby increasing its interior volume and causing milk to flow into it. The milk in the dispensing tube E is retained therein by a normally closed stem valve H closing the lower end of the dispensing orifice thereof. The valve D then closes and the body B telescopes slightly in relation to the tube E thereby applying a positive pressure on the milk in the tube E which opens the valve H due to its association with a pressure responsive actuating means I permitting the charge of milk to flow into a container properly disposed in surrounding relationship with the lower end of the tube E at a rate governed by the positive pressure superimposed on the hydrostatic head of milk in the tube E, i.e. the greater this positive pressure, the more the valve H opens. Pressure is maintained on the milk within the tube E by the continued upward movement of the tube E, telescoping it with respect to the body B until a predetermined metered charge of milk has been dispensed. Cessation of this last mentioned telescoping motion results in a cessation of the positive pressure thereby automatically closing the valve H and terminating filling.

As a preferred or exemplary embodiment of the apparatus of the instant invention, FIG. 1 shows a fragment of an automatic rotary milk-filling machine of generally conventional design, and one of the metering-filling units U of the instant invention mounted thereon. The rotary machine comprises a reservoir 10 containing a large supply of milk and is suitably secured to and mounted on the top of a vertically disposed main drive shaft 12 extending downwardly through the center of the machine. Keyed to the shaft 12 to rotate in unison therewith is a turret 14 in which are mounted for rotation therewith, and for vertical sliding movement in relation thereto, two supporting brackets 16 and 18 (for each unit U) for supporting and actuating the telescoping members of the unit U as will be described more fully hereinafter. The lower end of the shaft 12 is rotatably mounted in a fixed hub 20, which is part of the main machine frame (not shown), which rotation is accomplished by a suitable driving mechanism well know to those skilled in the art and therefore not shown.

Surrounding and secured (preferably removably) to the outer circumference of the hub 20 are two hardened steel rings 22, 24 in which are accurately machined cam grooves 26, 28 respectively. Riding within the cam grooves 26 and 28 are cam follower rollers 30 and 32 respectively. Affixed to and extending upwardly from the rollers 30 and 32 are push rods 34, 36 respectively, which at their upper ends are affixed to slide blocks 38, 40 respectively which are integral with the brackets 16, 18 respectively and are mounted within a longitudinally extending groove 42 in the outer circumference turret 14. It is readily apparent that the mechanism just described, during rotation of the turret 14 about the hub 20, will cause vertical reciprocation of the support brackets 16, 18 according to a predetermined pattern as defined by the cam grooves 26, 28.

Integral with and extending outwardly from the base of the turret 14 is a skirt 46, having appropriate apertures 48 therein to permit the passage therethrough of the push rods 34, 36. The lower end of the skirt 46 terminates in an outwardly extending flange or platform 50 for receiving and supporting a container 52 to be filled with milk.

The metering and dispensing unit U has a circumferential flange 54 at its upper end through which it is securely bolted to the underside of the reservoir 10 in communication with an aperture therein adjacent its outer circumference. As best seen in FIG. 2, the upper end of the unit U is unrestricted so that milk can be continually supplied to the interior of the unit U from the reservoir 10.

Integral with and depending from the flange 54 is an open ended connecting tube 56. The lower end of the tube 56 is disposed within and in telescoping relationship with an upper extension 58 of an upper body 60. The lower end of the tube 56 is joined to the extension 58 by a flexible, rubber sleeve 62 to permit telescoping movement between the connected members. The upper circumference of the sleeve 62 is beaded or thickened at 64 which bead is retained in a suitable aperture adjacent the lower end of the tube 56 by means of an elongated ring 66 surrounding the major portion of the tube 56. The ring 66 is releasably held in place by a rotatable collar 68 retained in clamping position by a pin 70 (FIG. 1). As best seen in FIG. 1 rotatation of the collar 68 will align a slot 72 therein with the pin 70 and permit upward sliding of the collar 68 and thence upward sliding of the retaining ring 66 so as to release the upper end of the sleeve 62 thereby permitting disengagement of the sleeve 62 from the tube 56.

The lower end of the sleeve 62 is also thickened at 74 and frictionally engaged between the mating face of flanges 76, 78 on the extension 58 and body 60 respectively. The flanges 76, 78 are maintained in abutting relationship by means of a quick-opening, circumferential, spring clamp 80 engaging the outer surface of the flanges 76, 78. Release of the spring clamp 80 permits separation of the flanges 76, 78 and thus release of the sleeve bead 74 for removal of the sleeve 62 from the unit U.

A requirement for all commercial milk-filling machines is easy accessability for careful cleaning and sanitizing. By means of the structure defined immediately above, it is readily apparent that the flexible sleeve 62 can be quickly and easily removed from the unit U for such cleaning and sanitizing.

The tubular upper body 60 through its upper extension 58 is in open and unrestricted communication with the connecting tube 56 so that this upper body 60 and tube 56 are filled with milk as long as there is an adequate supply in the reservoir 10. A circular valve 82 having a circumscribing, resilient "O" ring 84 seats in fluid-tight engagement with a valve seat 86 at the lower extremity of an elongated, reduced diameter portion 88 of the body 60. Secured to and extending upwardly from the valve 82 through the portion 88 is a valve stem 90. Two spaced sets of radial vanes 92 extend outwardly from the stem 90 and ride against the inner surface of the portion 88 to maintain the valve stem 90 centralized within this portion. The upper end of the stem 90 remote from the valve 82 terminates in a hook or loop 94 which engages the inner extremity of an arm 96 of a valve actuating member, generally designated 98, mounted in and extending through a side port 100 in the upper valve body member 60.

The port 100 is formed from a lateral or outwardly extending tube 102 on the side wall of the valve body 60 terminating in a flange 104. A flange 106 on a ring 107 is secured to the flange 104 by means of a quick-opening circumferential spring clamp 108 similar to spring clamp 80. Clamped between the abutting faces of the flanges 104, 106 is the thickened, circumferential margin of a flexible diaphragm 110.

Extending through a central aperture in the diaphragm 110 is an extension 112 of the arm 96 with the major central portion of the diaphragm 110 clamped between a ferrule 114 on the arm 96 and a back-up block 116 on the outside of the diaphragm 110. The extension 112 extends through an aperture in the end of one arm 117 of a bell crank pivoted at 118 on a bracket secured to the outer wall of the upper body 60. A nut 119 threadedly engaged on the free end of the extension 112 secures the members of the valve actuator 98 together on the diaphragm 110. The other arm 120 of the bell crank extends laterally and downwardly and is biased towards the portion 88 by a tension spring 121 hooked at its inner end to the portion 88 and at its outer end to the arm 120. This bias maintains the actuator in an outward position so that the valve 82 is normally closed. A push rod 122 is pivotally connected to a median portion of the arm 120 and extends transversely of the portion 88 on one side thereof through guides 123 secured to the portion 88 and terminates in a yoke in which is rotatably mounted a roller bearing 124.

Situated in the path of travel of the bearing 124 during its orbital movement along with the unit U mounted on the rotating turret 14 is a rail segment 130 having stepped face 132 on its inner side. The segment 130 is stationary and fixed to the main frame of the machine in a suitable manner not shown. Upon engaging the step in the face 132 the rod 122 is forced to the right as viewed in FIGS. 1 and 2–2A thereby rocking the bell crank against the action of the spring 121, thereby rocking the valve actuator 98 inwardly on the flexible diaphragm 110, which in turn opens the valve 82 thereby communicating the interior of the upper body 60 with a lower body, generally designated 134. The rail segment 130 is of sufficient vertical width so that it will engage the bearing 124 regardless of the vertical position of the upper body 60.

The lower body 134 is generally in the shape of a hollow tube with its upper end surrounding the restricted lower end 88 of the upper body 60 in telescoping relationship. Connecting the lower body 134 and restricted portion 88 in fluid-tight joints are two flexible rubber sleeves 136 and 138 vertically spaced from each other and defining a closed chamber 135 therebetween. Each sleeve has a thickened circumferential bead at each end; the thickened bead at one end of each sleeve being clamped between the abutting faces of flanges 137, 139 held together by quick-opening, circumferential, spring clamps 141 in a manner described for the thickened beads 74 of the sleeve 62; and the bead at the opposite end of each sleeve 136, 138 is clamped in grooves in the lower portion 88 surrounded by ring clamps 143, 145 held in place by means of a retaining ring 140, similar to the retaining ring 68. The ring clamps may be released and raised for the release of the lower ends of the sleeves 136, 138 in the same manner as with the ring 66. Extending through the side wall of the lower valve body 134 is a vacuum port 142 communicating with the chamber 135 and in which is threadedly engaged a flexible conduit 144 leading to a suitable source of vacuum (not shown). Due to the vacuumized condition of the chamber 135, when the lower body 134 is telescoped into its full up position (FIG. 2–2A), atmospheric pressure maintains the upper sleeve 138 against the inner surface of the lower body 134; and pressure within the body 134 maintains the lower sleeve 136 against the outside of the ring 145. This arrangement insures the accuracy of the predetermined, metered charge of milk dispensed by eliminating fluttering of the sleeve 136 during operation of the unit U.

Disposed in a lateral or outwardly extending tubular port 146 in the side wall of the lower valve body 134, which port 146 is similar to the port 100, is a pressure responsive foot-valve actuator, generally designated 148. The valve actuator 148 is mounted in the center of a flexible diaphragm 150 in a manner identical to that of the valve actuator 98 and has a similar, inwardly disposed arm 152 engaging the upper end of a stem 156 having radial, centralizing vanes 157 which, at its lower end terminates in a foot valve 158 seated within the dispensing orifice 160 of an elongated foot 162 adapted to extend downwardly almost to the bottom of the container 52 to be filled. Retained on an outward extension 166 of the arm 152 by means of a nut 168 is a supporting lever 170 pivotally mounted at its opposite end at 172, on a bracket integral with the outside of the lower valve body 134. Foot valve actuator 148 is normally disposed in its inward position by its own weight and that of the arm 152, stem 156 and foot valve 158 or, if desired, by a suitably arranged compression spring (not shown) so that the foot valve 158 normally closes off the orifice 160. To prevent premature opening of the foot valve 156 by the hydrostatic pressure of the milk thereabove when the valve 82 is opened, a rail segment 171 mounted on the machine frame in a suitable manner and having a stepped face 173 which engages the rounded end of the nut 168 positively holds the valve actuator in an inward position and thereby the foot valve closed until the unit U is in position and condition to fill a metered quantity of milk into the container 52.

Disposed between the main portion of the lower body 134 and its tubular extension or foot 162 is a restrictor 174 centrally apertured to permit the stem 156 to pass therethrough and having additional apertures 176 therein to permit the milk to flow therethrough in a restricted manner. The restrictor 174 is composed preferably of a soft elastic material, such as rubber or plastic, and functions to provide back pressure in the main chamber of the lower body 134 above the foot 162 to maintain the valve actuator 148 in constant outward position without chattering during filling.

Fixed to and depending from the main portion of the lower body 134 in surrounding relationship to the foot 162 is a skirt or shield 178. The shield 178 protects the foot 162 from contamination by its surroundings; and in the lowermost position of the foot during filling of the container 164, the shield 178 surrounds the container 164 to protect it from contamination by its environs.

Referring to the sequence of operations of the valve unit U, the start of the sequence and the relative position of the elements in the unit U are shown in FIGS. 1 and 2-2A. The entire unit U is filled with milk at all times. As best shown in FIG. 2-2A, both the lower body 134 and upper body 60 are in the up position. The bearing 124 has been engaged by the rail segment 130 so that the valve actuator 98 has been rocked inwardly thereby opening the valve 82 communicating the interiors of the lower and upper bodies 134 and 60. The container 52 is disposed beneath the unit U on the platform 50 in filling position, as also shown in FIG. 1. With the elements of the unit U so arranged, the lower body 134 descends from its telescoping relation with the upper body 60 so as to dispose the foot 162 within the container 52 with the dispensing orifice 160 adjacent the bottom of the container (FIG. 3). Due to the communication therebetween, by virtue of the open valve 82, milk flows from the upper body 60 continuously into the lower body 134 as the lower body 134 is increasing in internal volume thereby maintaining it full at all times. To prevent premature operation of the foot valve actuator 148 by the pressure exerted by the hydrostatic head of milk, the rail segment 171 engages the outer end of the nut 168 preventing outward oscillation of the actuator 148.

When the foot 162 has completed its descent into the container 52 the roller bearing 124 rolls off the rail 130 whereupon, due to the tension spring 121, the free bell crank rotates in a clockwise direction, rocking the valve actuator 98 outwardly, lifting the arm 96, and through the stem 90, closes valve 82 (FIG. 4). During this time, the nut 168 rides off the rail segment 171 and frees the actuator 148 for movement. At this point the follower roller 30 travelling in the cam groove 26 (FIG. 1) descends to its lower position thereby pulling down the rod 34 and thence the slide block 38 and its integral bracket 16 connected to the upper body 60, thereby lowering the upper body 60 from its telescoping relation with the lower end of the connecting tube 56 (FIG. 5). This action causes a slight telescoping of the restricted portion 88 with the lower body 134 thereby applying a slight superimposed pressure on the milk within the lower body 134.

Although the full hydrostatic head of milk from the reservoir 10 down to the actuator 148 (when the valve 82 is open) produces sufficient pressure to move the actuator 148 outwardly and open the foot valve 158, the liquid head from the closed valve 82 down, due to the weight of the arm 152 and elements depending therefrom, is not sufficient to move the actuator 148, especially if it is spring loaded in an inward position. However, under the impetus of the superimposed pressure, the actuator 148 rocks outwardly lifting the arm 152; and through its stem 156, the foot valve 158 opens the orifice 160 to permit flow of milk from the foot 162 into the waiting container 52.

At this point (FIG. 6) the push rod 36 begins to raise due to the impetus of the follower roller 32, riding upwardly in its cam groove 28 thereby pushing the slide block 40 upwardly. Due to its securement to the bracket 18, which is integral with the slide block 40, the lower body 134 is gradually raised away from the bottom of the container 52 being filled. Except for the very initial discharge of milk to fill the space between the orifice 160 and the bottom of the container 52, the orifice 160 is always maintained below the milk level in the container to minimize foaming.

When the lower body 134 has reached the upper limit of its telescoping relation with respect to the reduced diameter portion 88 but with the foot 162 still disposed partially within the container 52, telescoping movement of the lower body 134 ceases. Such cessation of this telescoping movement released the superimposed pressure on the head of milk on the lower body 134 whereby the foot valve actuator 148 rocks inwardly to its normal position thereby closing the foot valve 158 and is maintained in this position for a succeeding portion of the cycle by the rail segment 171 (FIG. 7). The complete withdrawal of the foot 162 from within the container is accomplished by telescoping movement between the upper body 60 and the connecting tube 56 during which time the roller bearing 124 again contacts the rail segment 130, opening the valve 82 to complete the cycle and return the relationship of the elements of the unit U to the position shown in FIG. 8 and FIG. 2–2A for a recommencement of the cycle.

The quantity of milk dispensed from the unit U is a function of the amount of telescoping of the lower body 134 with respect to the upper body 60. It is readily apparent that this amount of telescoping may be easily varied by changing the path of the cam groove 28 by any suitable means obvious to those skilled in the art, thereby increasing or decreasing the vertical travel of the follower 32, rod 36, block 40 and bracket 18 associated therewith.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A liquid metering and dispensing apparatus comprising a liquid reservoir having a tubular outlet end, dispensing means having a tubular inlet end disposed in telescoping relation with said reservoir outlet end, resilient sealing means connecting said outlet and inlet ends to permit telescoping movement between said reservoir and said dispensing means while maintaining a fluid-tight connection therebetween, first valve means between said reservoir and said dispensing means and operatively associated with said reservoir to control communication of said reservoir with said dispensing means, and second valve means in said dispensing means responsive to both said telescoping movement and to pressure changes within said dispensing means to control the dispensing of a predetermined volume of said liquid.

2. The apparatus set forth in claim 1 wherein said reservoir comprises a first member having a tubular outlet end, a second member having a tubular inlet end disposed in telescoping relation with said first member outlet end, and resilient sealing means connecting said first member outlet end with said second member inlet end to maintain a fluid-tight connection therebetween during relative telescoping movement thereof.

3. The apparatus set forth in claim 2 wherein said first valve means is operatively associated with said second member.

4. The apparatus set forth in claim 1 wherein said slidable sealing means is a flexible sleeve.

5. The apparatus set forth in claim 1 wherein said first valve means is actuated by mechanical means at least a portion of which is external of said apparatus.

6. The apparatus set forth in claim 1 wherein means telescope a portion of said reservoir with respect to another portion while said first valve means is closed to increase the pressure in said dispensing means and open said second valve means to permit flow of a metered quantity of liquid therefrom.

References Cited by the Examiner

UNITED STATES PATENTS

| | | | |
|---|---|---|---|
| 2,592,846 | 4/1952 | Ayars | 141—147 X |
| 2,755,980 | 7/1956 | Jacobs et al. | 141—147 X |
| 2,761,607 | 9/1956 | Ayars | 141—147 |
| 3,128,915 | 4/1964 | Matter | 222—355 X |

ROBERT B. REEVES, *Primary Examiner.*

HADD S. LANE, *Examiner.*